US012257462B1

(12) United States Patent
Ashby

(10) Patent No.: US 12,257,462 B1
(45) Date of Patent: Mar. 25, 2025

(54) VICTIM EXTRACTION TOOL

(71) Applicant: Charles Ashby, Jarrell, TX (US)

(72) Inventor: Charles Ashby, Jarrell, TX (US)

( * ) Notice: Subject to any disclaimer, the term of this patent is extended or adjusted under 35 U.S.C. 154(b) by 659 days.

(21) Appl. No.: 17/475,110

(22) Filed: Sep. 14, 2021

Related U.S. Application Data

(60) Provisional application No. 63/080,604, filed on Sep. 18, 2020.

(51) Int. Cl.
*A62B 35/00* (2006.01)
*A62B 5/00* (2006.01)

(52) U.S. Cl.
CPC ............ *A62B 35/0006* (2013.01); *A62B 5/00* (2013.01)

(58) Field of Classification Search
CPC ............ A62B 35/0006; A62B 35/0012; A62B 35/0025; A62B 35/0037
USPC ........................................................ 294/140
See application file for complete search history.

(56) References Cited

U.S. PATENT DOCUMENTS 1,535,208 A 4/1925 Drennan
2,996,228 A 8/1961 Bauman
6,397,389 B1 * 6/2002 Schultz ................ A47D 13/046 54/71
6,871,368 B2 3/2005 Calkin
7,467,419 B2 12/2008 O'Neal et al.
7,971,273 B2 7/2011 Grilliot et al.
8,002,082 B2 8/2011 Snedeker
8,015,619 B2 9/2011 McKay et al.
8,162,365 B2 4/2012 Escobar
8,360,202 B1 1/2013 Woodard
8,375,467 B2 2/2013 Real et al.
8,430,204 B1 4/2013 Reynolds
8,745,792 B2 6/2014 McGlynn
9,498,008 B2 11/2016 Murphy et al.
10,016,002 B2 7/2018 Murphy et al.
10,561,866 B1 * 2/2020 Hinnant ............. A62B 35/0025
10,603,528 B1 3/2020 Bologna
10,668,309 B2 6/2020 Starholm et al.
2003/0146044 A1 8/2003 Jordan
2004/0182644 A1 9/2004 Kotarski
2005/0173188 A1 8/2005 Lewis et al.
2008/0184488 A1 * 8/2008 Fee .......................... A61G 1/01 5/628
2009/0095232 A1 4/2009 McKay
2009/0127300 A1 5/2009 Straight
2011/0030118 A1 2/2011 Pratchett
2011/0067953 A1 3/2011 Kopp
2013/0319793 A1 * 12/2013 Stibilj ................ A62B 35/0012 182/3
2015/0257458 A1 9/2015 Nykoluk et al.
2017/0216635 A1 * 8/2017 Stibilj ................ A62B 35/0018
2017/0281989 A1 10/2017 Wood
2019/0350779 A1 11/2019 Saxon

* cited by examiner

*Primary Examiner* — Dean J Kramer
(74) *Attorney, Agent, or Firm* — John Rizvi; John Rizvi, P.A.—The Patent Professor

(57) ABSTRACT

A rescue harness includes a strap. The rescue harness further includes at least one first responder fastener connected to a first portion the strap; and a head-rest support panel adjustably coupled to the strap to selectively adjust a position of the head-rest panel along a length of the strap relative to the at least one first responder fastener.

18 Claims, 13 Drawing Sheets

VICTIM EXTRACTION TOOL

CROSS REFERENCE TO RELATED APPLICATION

This application claims the benefit of U.S. Provisional Application 63/080,604, filed Sep. 18, 2020, which is hereby incorporated by reference herein in its entirety.

FIELD OF THE INVENTION

The present invention relates generally to rescue harnesses, and more particularly, to a rescue harness including a strap and a head-rest support panel adjustably coupled to the strap.

BACKGROUND OF THE INVENTION

Various types of equipment are used by firefighters and other first responders to protect against heat, smoke, and other hazards. Unfortunately, while emergency and protective equipment and gear protect against hazards, they can also be fairly heavy, large, and cumbersome for first responders to wear and/or carry. Emergency/protective equipment and gear can also make it challenging to transport injured, fearful and/or unconscious victims out of a dangerous environment, while at the same time wearing the heavy, large and/or cumbersome protective equipment/gear.

Various types of harnesses are available. However, many existing harnesses are also cumbersome and would add even more weight and complication to first responders' gear. Thus, while rescue harnesses may be available, it is typical for firefighters and other first responders to forgo use of a harness and instead carry an injured or unconscious victim over the first responders' shoulder and then to back out of a dangerous environment. Unfortunately, with using this technique, first responders are unable to see where they are going when they are backing out, which presents a potential hazard. In addition, this existing technique includes using the first responder's hands to secure the victim in place over the first responder's back/shoulder. Therefore, first responders are typically unable to use their hands to perform other first responder-related tasks, such as to fight a fire, use a weapon, or for guidance or other defensive purposes.

Accordingly, there is need for a solution to at least one of the aforementioned problems. For instance, there is an established need for, for example, a rescue harness that allows first responders to securely transport victims in a forward direction and/or with the first responders' hands free, while also being light-weight and compactable so as not to add excessive weight or complication to first responders' wearable equipment set.

SUMMARY OF THE INVENTION

The present invention is directed to a rescue harness. The rescue harness includes a strap; at least one first responder fastener connected to a first portion the strap; and a head-rest support panel adjustably coupled to the strap to selectively adjust a position of the head-rest support panel along a length of the strap relative to the at least one first responder fastener.

In a first implementation of the invention, the rescue harness is deployable by placing a second portion of the strap underneath both armpits of the victim to cause the strap to be disposed across an upper chest of the victim and placing the first portion of the strap over the victim's head to fasten the at least one first responder fastener to at least one of a garment, a belt and/or a wearable equipment worn by the first responder transporting the victim in a forward-facing position of the first responder. In a second aspect, the first portion is a top portion of the strap, and the second portion is a bottom portion of the strap. In another aspect, the at least one first responder fastener is deployable by fastening the at least one first responder fastener to at least one of a rear portion of a garment, a belt and/or a wearable equipment worn by the first responder.

In a second aspect, the strap is a continuous, unitary strap. In another aspect, the strap is a load-bearing strap configured to bear at least a 1000 pound (lb.) load. In yet another aspect, the strap is comprised of a web strapping material. In another aspect, the strap is a flexible strap.

In another aspect, the strap is shaped as a closed loop strap. In another aspect, the strap is shaped as an open loop strap. In another aspect, the head-rest support panel is adjustably coupled to opposite sides of the strap.

In another aspect, the head-rest support panel is sized, shaped and/or configured to support a head and a neck area of a standard-sized adult victim to be transported by the rescue harness. In a further aspect, the head-rest support panel is sized, shaped and/or configured to further support a shoulder area of the victim. In another aspect, the head-rest support panel comprises a length and a width defining a panel area configured to stabilize a head and a neck of a standard-sized adult victim being transported by the rescue harness.

In another aspect, the head-rest support panel is adjustably coupled to the strap by being selectively adjustable along an elongated length of the strap between a top portion to a bottom portion of the strap.

In another aspect, the head-rest support panel comprises a first loop and a second loop, the first and second loops disposed on opposite ends of the head-rest support panel. In a further aspect, the strap is received within the first and second loops for slidably adjusting a position of the head-rest support panel along the length of the strap based on a position of the victim's head.

In another aspect, the head-rest support panel is slidably removable from the strap. In another aspect, the head-rest support panel is slidably removable from the strap by decoupling absolute ends of the strap from the head-rest support panel. In yet another aspect, the head-rest support panel is comprised of a washable material. In another aspect, the head-rest support panel is a flexible.

In another aspect, an arrangement of the strap and the head-rest support panel are configured to lock the position of the head-rest support panel in place with a pressure from at least a portion of the victim's body weight on the strap as the rescue harness is deployed on the victim and used to transport the victim.

In another aspect, the at least one first responder fastener is selectively couplable to at least one of a garment, a belt and a wearable equipment worn by the first responder. In another aspect, the at least one first responder fastener includes at least one carabiner.

In another aspect, the at least one first responder fastener is configured to provide at least one corresponding connection point of the rescue harness to the first responder.

In another aspect, the at least one first responder fastener comprises two first responder fasteners at opposite ends of the strap. In a further aspect, the two first responder fasteners are configured to provide two corresponding connection points of the rescue harness to the first responder.

In another aspect, the rescue harness further includes a second fastener connected to a second portion of the strap. In a further aspect, the second portion of the strap at which the second fastener is disposed is opposite the first portion of the strap at which the at least one first responder fastener is connected.

In another aspect, the second fastener includes a D-ring.

In another aspect, the second fastener includes a carabiner.

In another aspect, the rescue harness is storable in a transport pouch. In another aspect, the strap is a flexible strap, and the head-rest support panel is a flexible panel. In a further aspect, the rescue harness is configured to be stored in the transport pouch by folding or rolling the flexible strap material and flexible head-rest support panel material and inserting the folded material into the pouch along with one or more of the fasteners.

In another aspect, the transport pouch is attachable to at least one of a garment, a belt and/or a wearable equipment worn by the first responder.

In a second implementation of the invention, the rescue harness comprises a strap with at least three (3) first responder fasteners for affixing a flexible head-rest support to a first responder and a victim. The rescue harness is deployable by placing a first portion (i.e., the top portion of the strap over the victim's head to fasten a first one of first responder fasteners and a second one of the first responder fasteners to at least one of a garment, a belt and/or a wearable equipment worn by the first responder transporting the victim in a forward-facing position of the first responder, and placing a second portion (i.e., the bottom portion) of the strap underneath both armpits of the victim to cause the strap to be disposed across an upper chest of the victim together with a third one of the first responder fasteners that is secured to an elastic restraint. In another aspect, the first responder fasteners are deployable by fastening the first one and the second one of the first responder fasteners to at least one of a rear portion of a garment, a belt and/or a wearable equipment worn by the first responder.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
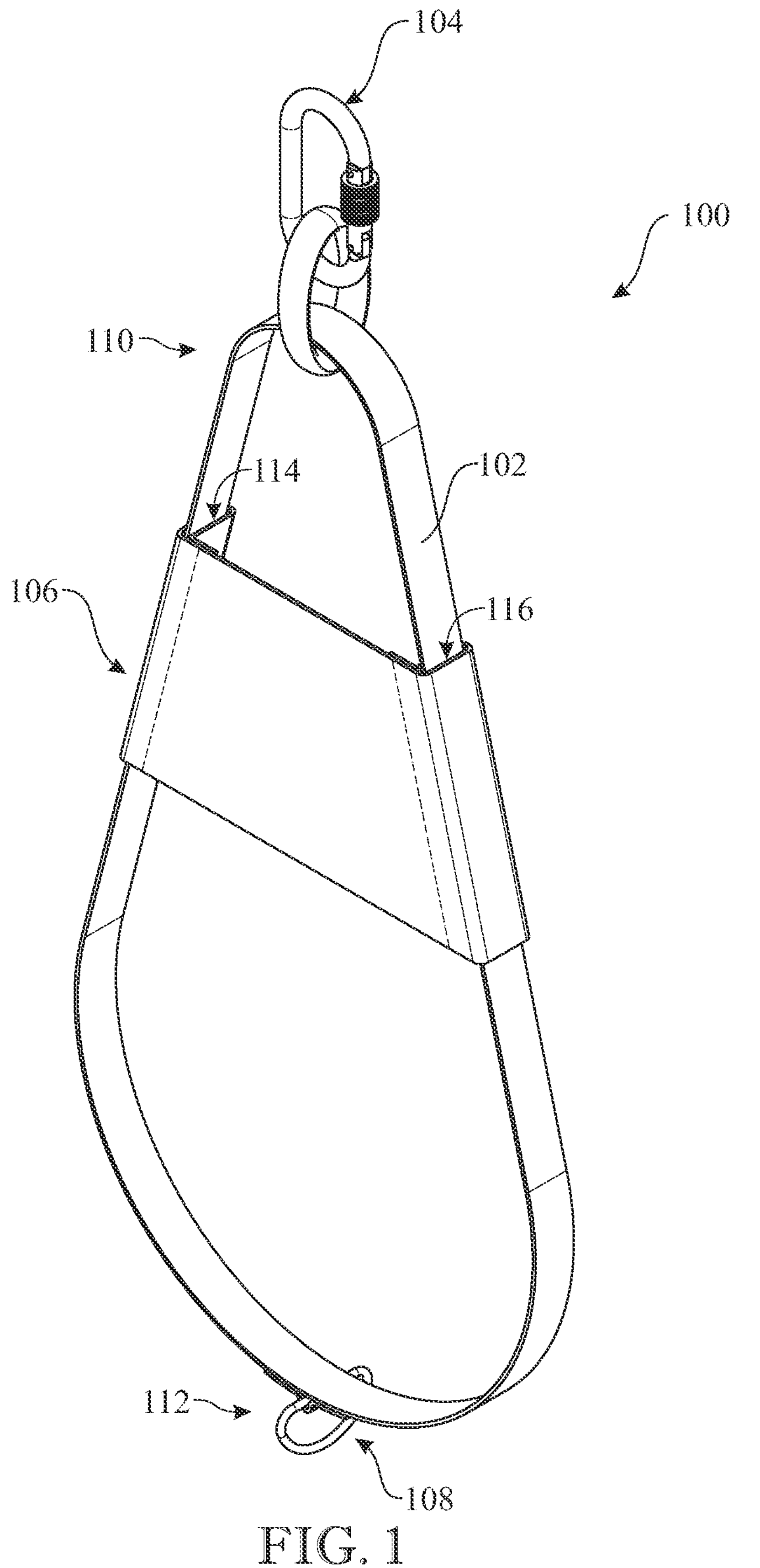
FIG. 1 presents a front, perspective view of a rescue harness in accordance with a first illustrative embodiment of the present invention.
Figure 2:
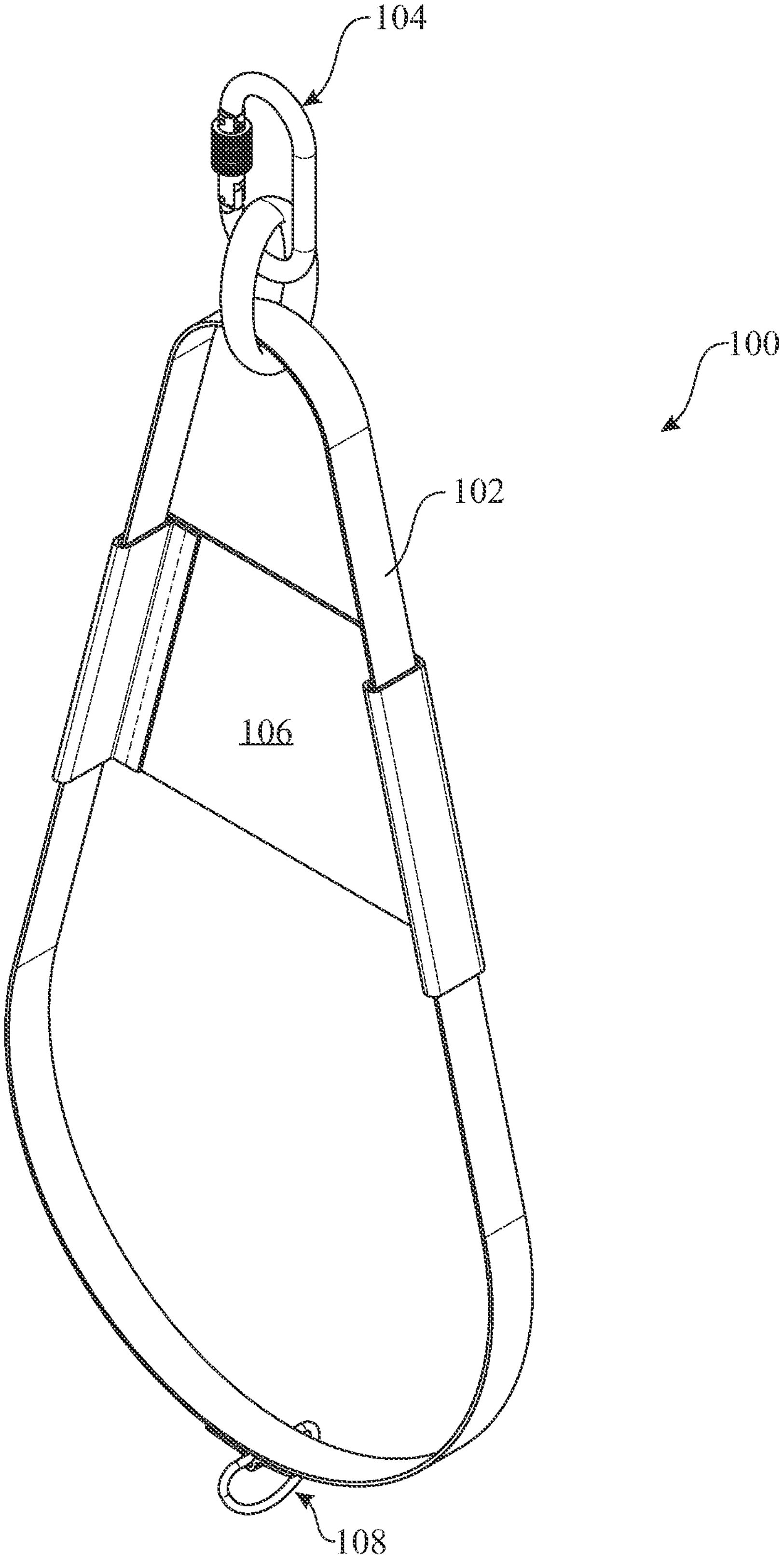
FIG. 2 presents a rear, perspective view of the rescue harness in accordance with the first illustrative embodiment of the present invention.
Figure 3:
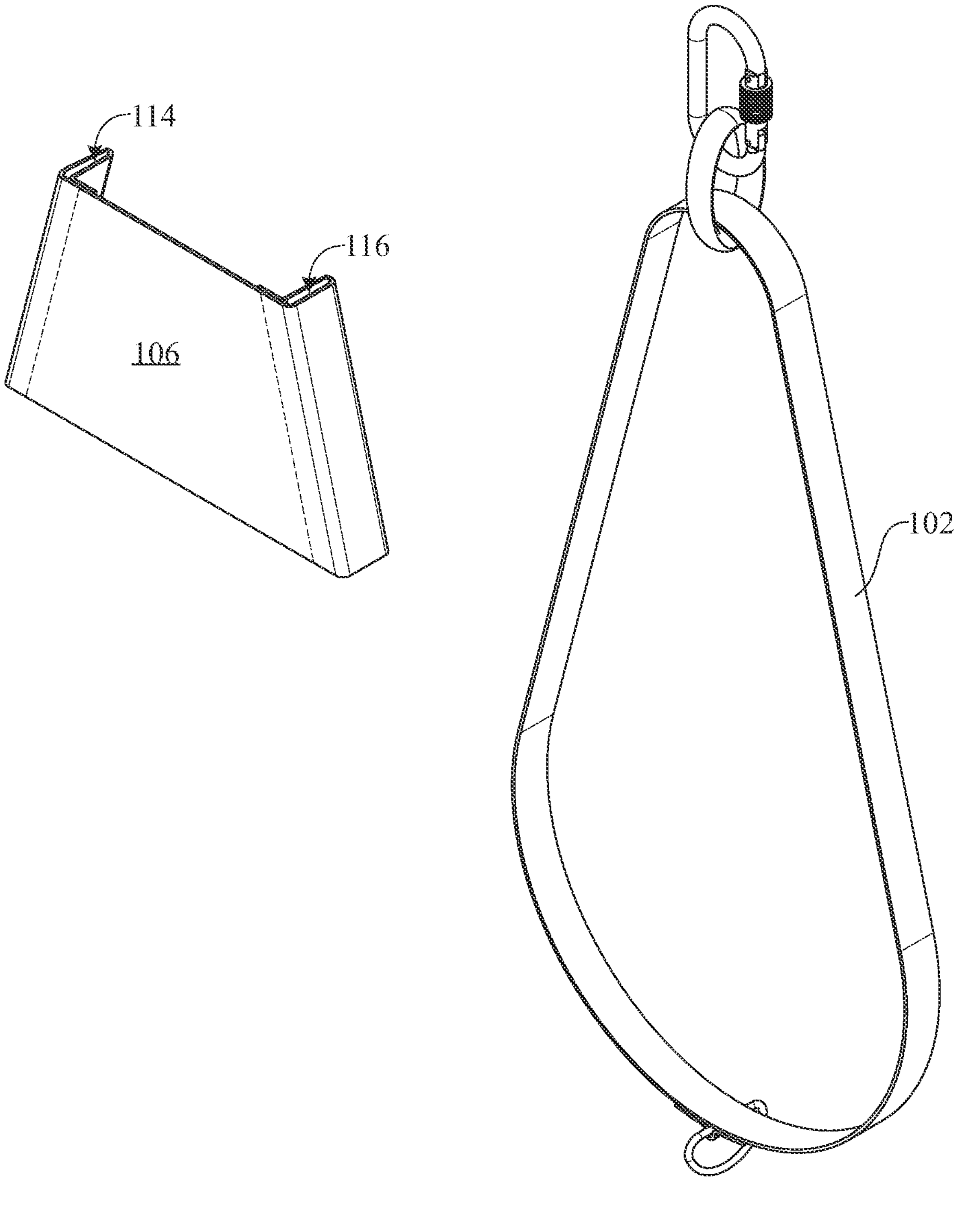
FIG. 3 presents a front, perspective view of a strap and a head-rest support panel of the rescue harness illustrated in FIG. 1, in a disassembled configuration.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper/top", "lower/bottom", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a rescue harness including a strap and a head-rest support panel adjustably coupled to the strap.

In some embodiments, a victim rescue and extraction harness is provided that enables an emergency worker to safely and/or more comfortably pull a victim from a site, as compared to existing arrangements. The rescue harness may include a fastener, such as, a carabiner which connects to, for example, a backpack, a belt, or a rear harness on the first responder/rescue personnel, enabling such first responder/rescue personnel to have free hands while moving/transporting the victim. The rescue harness itself may secure the victim under the victim's armpits and across the chest while also having a head-rest.

In some embodiments, the first responder/rescue personnel places the strap across the victim's chest and under their arms. The strap remains under the victim's armpits. The first responder/rescue personnel may slide the head-rest into place under the victim's head and the first responder/rescue personnel may then walk, crawl, or otherwise move away from the hazardous site pulling the victim and with his/her hands free and also be able to see where he/she is going.

In some embodiments, the strap and fastener (e.g., carabiner) allows the first responder/rescue personnel to exit the hazardous site facing forward instead of "backing out". The head-rest lifts and stabilizes the head and neck of the victim. In some embodiments, this may be less harsh on the victim's body, while also allowing the responder/rescue personnel to see where they are going. Also, some embodiments may allow full use of the responder/rescue personnel's hands, which can be critical to survival in certain situations.

Some embodiments may provide a rescue harness that is physically easier on the responder/rescue personnel, as well as the victim. Some embodiments of the rescue harness may provide much faster victim extraction times, as compared to existing techniques. Some embodiments of the rescue harness may provide the responder/rescue personnel with a hands-free arrangement once the victim is attached to the rescue harness.

Some embodiments may provide a carabiner that is configured to and/or adapted to attach/fasten to air packs, duty belts, regular pants, etc. In some embodiments, the strap is configured to "cinch up" to be a one size fits all (or most). In some embodiments, the head-rest is configured to slide up and down along the strap for selective placement and then lock into place with pressure from the strap. In some embodiments, the rescue harness may include a D-ring fastener attached to the strap.

In some embodiments, a victim extraction tool is provided that allows for a single responder/rescue personnel to transport the victim more easily, faster, and safer than existing techniques. Some embodiments may provide a rescue harness that is safer for the victim and first responder because the first responder is able to move in a forward-facing direction and provides the first responder with full use of both hands. Whether crawling or walking, some embodiments of the victim extraction tool allow the first responder to be fully functional to fight a fire, use a weapon or use his/her hands for guidance or for other defense purposes. Some embodiments may provide a rescue harness that allows for quicker and safer extractions from a multitude of scenarios, while stabilizing/securing the victim's head and neck area.

Some embodiments provide a victim rescue and extraction harness that enables an emergency worker to pull the victim more safely and comfortably from a site, as compared to existing arrangements. The harness may include a carabineer, which connects to a backpack or rear harness, or other gear worn by the first responder, enabling the first responder to have free hands while transporting the victim. The harness itself secures the victim under the armpits and across the chest, while also providing a selectively adjustable headrest. In some embodiments, when in use, the structure of the harness is configured to support and/or maintain the head, neck and/or shoulders of the victim off of the ground.

Some embodiments may advantageously provide a rescue harness that is light-weight and compact. The first responder may not be required to also wear a harness. The victim may not be required to wear a bulky harness. Some embodiments may provide a built in D-ring at the center of the strap to permit a second victim to also be transported/evacuated. Some embodiments may provide a head-rest area so that the victim's head does not contact or bounce against the ground. Some embodiments may function well in a zero visibility area because it is attached to the first responder. Some embodiments may allow for maximum leveraging because, when deployed on the victim, the rescue harness is configured such that the pulling force is based on the first responder's leg strength. Some embodiments may allow first responders to reposition themselves more easily to selectively move in either a forward direction or a backward direction by simply placing their legs over the strap. Some embodiments may free up the first responder's hands for other purposes. Some embodiments may provide a rescue harness that can be attached at various locations to emergency/rescue equipment, such as, for example, to a self-contained breathing apparatus (SCBA) Some embodiments may include a rescue harness assembly including the rescue harness as well as a storage pouch, the storage pouch being selectively attachable to the first responder or more particularly to wearable equipment or garments on the first responder. In some embodiments, the rescue harness and/or the storage pouch may also be attached to a drag rescue device (DRD).

Having generally described some embodiments of the present invention, a more detailed description is provided below of an example rescue harness according to one embodiment of the present invention.

Referring initially to FIGS. 1-7, a rescue harness 100, is illustrated in accordance with a first exemplary embodiment of the present invention. As shown for instance in FIG. 1, the rescue harness 100 includes a strap 102, a first responder fastener 104, a head-rest support panel 106 and a second fastener 108. The strap 102 includes a first portion 110 and a second portion 112.

The strap 102 may be a load-bearing strap. In some embodiments, the strap 102 may be configured to bear at least a 1000 pounds (lbs.) load. In some embodiments, the strap 102 may be configured to bear more or less than 1000 pounds but should preferably be configured to be able to bear at least the weight of an average-sized adult male.

In some embodiments, the strap 102 is formed of a flexible material that is rated for a target strength and durability for the particular rescue purposes. For example, in firefighting applications, the strap 102 may be formed of a flexible, 1"-2" tubular webbing material that is formed of a flame-resistant material. In some embodiments, the strap 102 may be made of, for example, a polyvinyl chloride (PVC) coated nylon, a vinyl-coated polyester, a two-way or four-way stretch nylon blend, a polyester mesh, or any other suitable strap material. The strap 102 is further preferably made of a washable material so that the rescue harness 100 can be washed for re-use with another victim.

Figure 8:
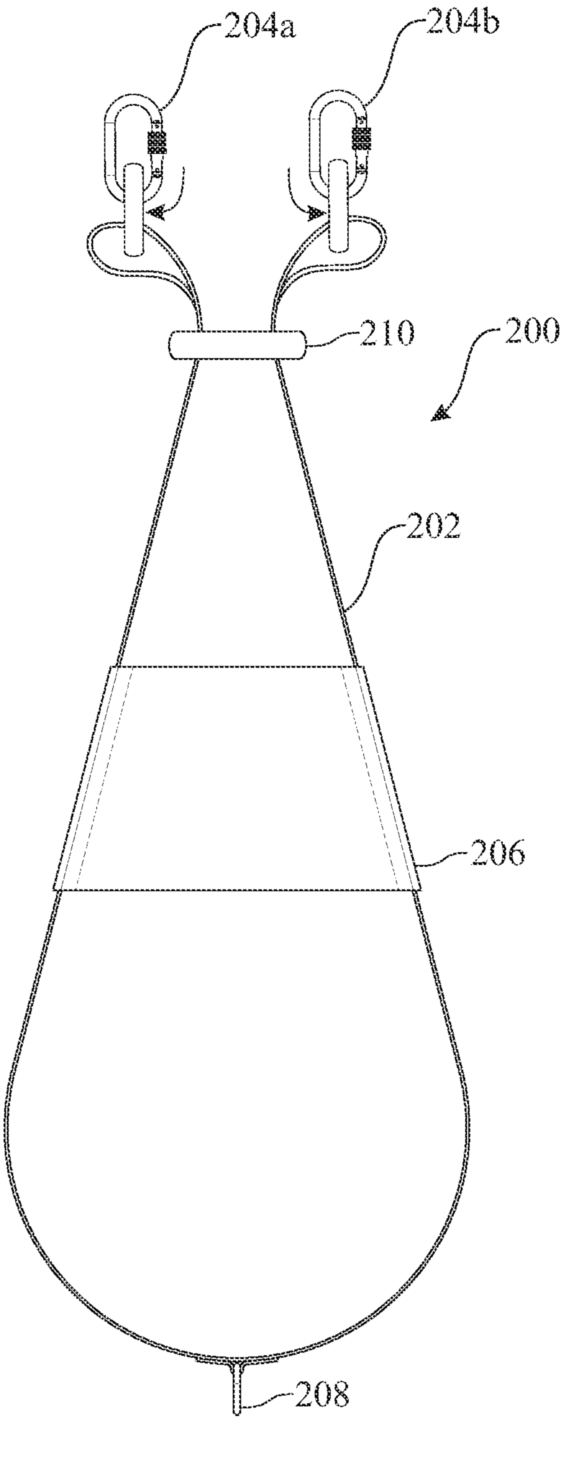
FIG. 8 is a front, perspective view of the rescue harness in accordance with a second illustrative embodiment of the present invention, illustrating an open loop strap in which the head-rest support panel is slidably removable from the strap and having a dual-connection point arrangement.

In some embodiments, the strap 102 is a single-strap piece, i.e., unitary/continuous strap material. In some embodiments, the strap 102 is shaped as a closed loop, as shown in FIG. 1 for example. In other embodiments, the strap 102 may be shaped as an open loop (see e.g., FIG. 8). For example, the strap 102 may be a single elongated strap formed as an open loop by, for example, the head-rest support panel 106, as shown in FIG. 8. The size of the strap 102 is preferably configured to provide sufficient length to, when deployed in use, pull a victim on the ground, while also being able to fasten a portion of the strap 102 to the first responder (e.g., a rear portion of a belt, a backpack, or a wearable equipment disposed on the first responder).

The head-rest support panel 106 may be formed of a flexible material that is rated for a target strength and durability for the particular rescue purpose of supporting the victim's head. In some embodiments, the head-rest support panel 106 is sized, shaped, and configured to support a head and neck area of a victim to be rescued. In some embodiments, the head-rest support panel 106 may be made of a flame-resistant material. In some embodiments, the head-rest support panel 106 may be made of a washable material so that the rescue harness 100 can be washed for re-use with another victim.

Figure 5:
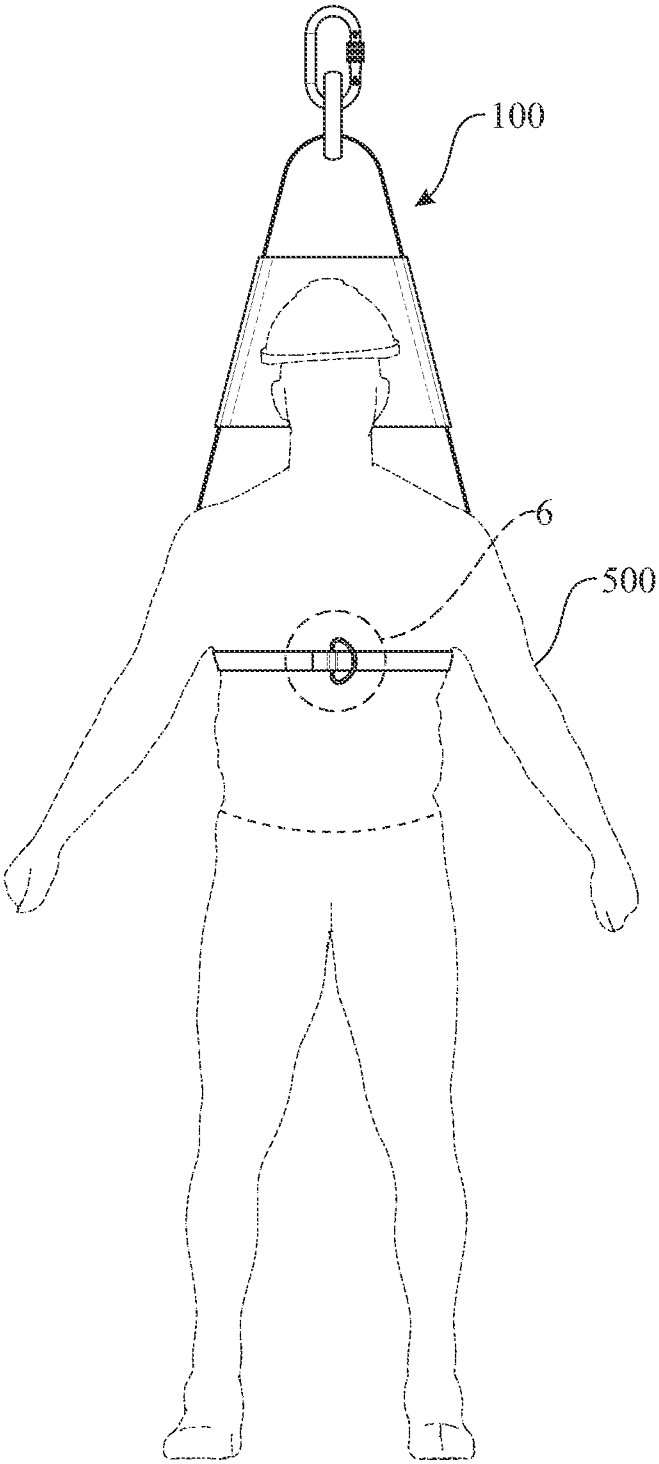
FIG. 5 presents a plan view of the rescue harness deployed on a victim in accordance with the first illustrative embodiment of the present invention.

In some embodiments, the head-rest support panel 106 includes a length and a width defining a panel area configured to support/stabilize a head and a neck of a standard-sized victim being rescued/support by the rescue harness 102. In some embodiments, the head-rest support panel 106 includes a length and a width defining a panel area configured to support/stabilize a head, a neck and shoulders of a standard-sized victim being rescued/support by the rescue harness 100. In some embodiments, the standard-sized victim is an adult victim 500, such as shown in FIG. 5. Some embodiments may be sized to support a standard-sized child victim.

In some embodiments, the head-rest support panel 106 may be trapezoidal shaped, as shown in FIG. 5 for example. In other embodiments, the head-rest support panel 106 may be formed as other shapes but is preferably sized and shaped and dimensioned (length and width) to define a panel area to support/stabilize at least a head and a neck area of a standard-sized victim.

Figure 4:
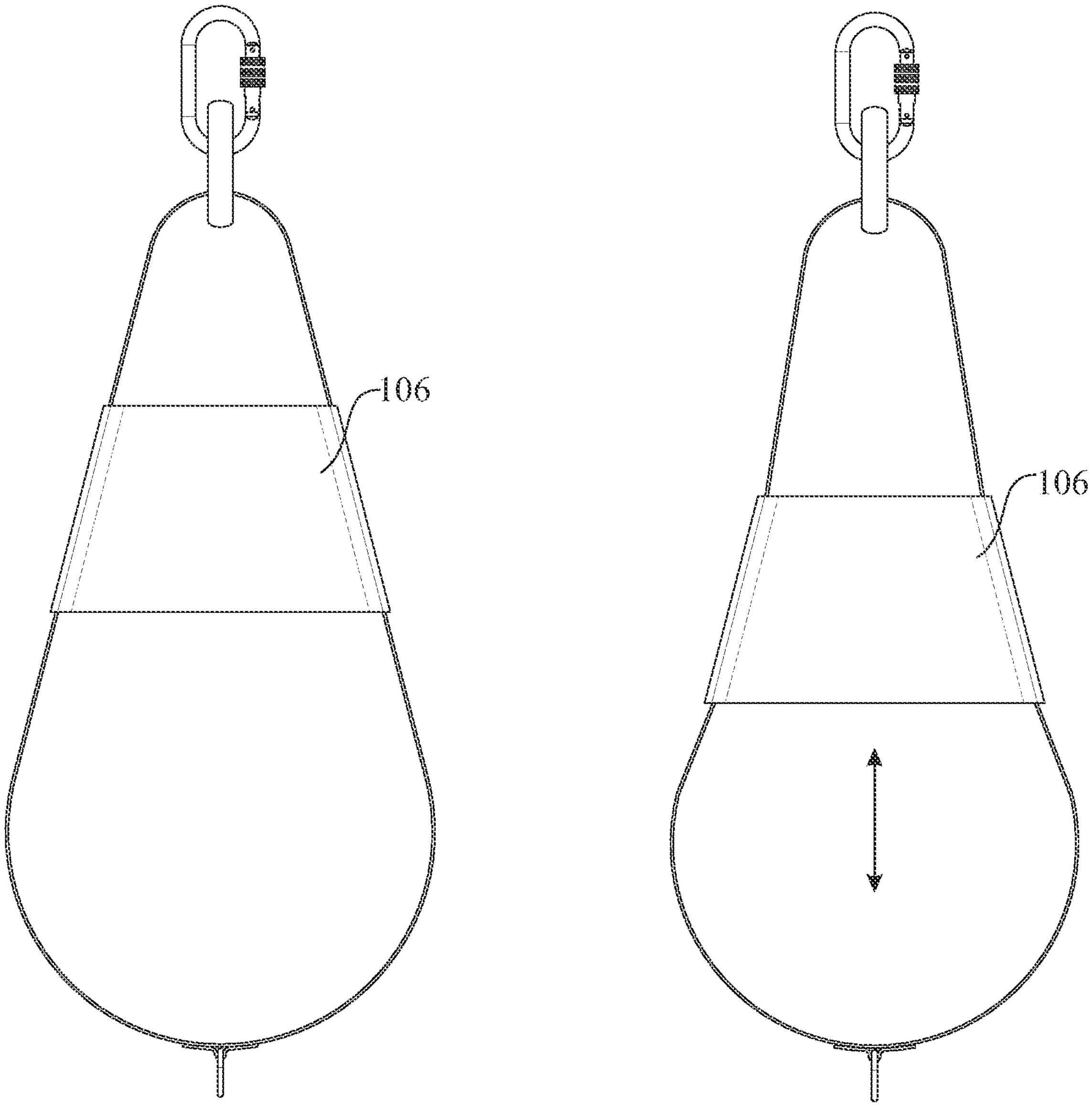
FIG. 4 presents a front, elevational view of the rescue harness having the head-rest support panel in a first position and adjusted to a second position in accordance with the first illustrative embodiment of the present invention.

The head-rest support panel 106 is adjustably coupled to the strap 102 to allow the first responder to selectively adjust a position of the head-rest support panel 106 along a length of the strap 102, e.g., relative to the first responder fastener 104. For example, FIG. 4 illustrates an example rescue harness 100 having the head-rest support panel 106 in a first position (left hand side) and then selectively adjusted to a second position (right hand side). In this manner, the first responder can selectively adjust the position (e.g., vertical position) of the head-rest support panel 106 along the length of the strap 102 to suit, for example, the first responder's preferred positioning of the victim relative to the first responder and/or for a size and a height of the particular victim being transported. In some embodiments, the head-rest support panel 106 is adjustably coupled to opposite sides of the strap 102, as shown in FIG. 1 and FIG. 8, for example. In this manner, the victim's head can be symmetrically supported by the head-rest support panel 106.

In some embodiments, the head-rest support panel 106 is removably coupled to the strap 102. In some embodiments, the head-rest support panel 106 may be slidably removable from the strap 102 by decoupling absolute ends of the strap 102 from the head-rest support panel 106. This may allow the head-rest support panel 106 to be switched out in order to be replaced with a new (or washed) head-rest support panel 106, if, for example, the original head-rest support panel 106 becomes damaged, stained, or it is otherwise desired to switch out the head-rest support panel 106 for another one. For example, FIG. 8 shows an example rescue harness including an open-loop design for the strap. As can be seen in FIG. 8, the fasteners can be removed and the head-rest support panel 106 can be entirely removed and separated from the strap.

In some embodiments, the head-rest support panel 106 may include a first loop 114 and a second loop 116. The first and second loops 114, 116 may be disposed on (and/or defined by) opposite ends of the head-rest support panel 106. The strap 102 may be slidably and/or adjustably received within the first and second loops 114, 116 to selectively adjust a position of the head-rest support panel 106 along the elongated length of the strap 102 relative to, for example, the first responder fastener 104. In some embodiments, the head-rest support panel 106 is adjustable up and down selectively for placement/positioning of the victim's head and then the selected position is locked in place with the pressure on the strap 102 (see for example FIG. 7 where a weight of the victim applies pressure on the strap 102 and secures the position of the head-rest support panel 106). In other embodiments, the head-rest support panel 106 may be coupled to the strap 102 in other configurations.

In some embodiments, the first responder fastener 104 may be coupled to the first portion 110 of the strap 102, which may be considered a top portion of the strap 102. The second fastener 108 may be coupled to the second portion 112 of the strap, which may be considered a bottom portion of the strap 102.

The first responder fastener 104 may be selectively couplable to a garment, a belt and/or other wearable equipment worn by the first responder. In some embodiments, the first responder fastener 104 may be formed as a carabiner, as shown in the figures. In other embodiments, the first responder fastener 104 may be formed as a D-ring, loop, hook, buckle or any other type of known fastener or connector, but is preferably a quick-release fastener, such as the carabiner.

The first responder fastener 104 may be configured to provide at least one connection point of the rescue harness 100 to the first responder so that the first responder can pull or otherwise transport the victim with hands free. In some embodiments, the rescue harness 100 includes a single first responder fastener 104, which provides a single corresponding connection point of the rescue harness 100 to the first responder (see for example, FIG. 1). In other embodiments, the rescue harness 100 includes more than one first responder fastener 104 to provide more than one connection point. For example, FIG. 8 shown an embodiment including two first responder fasteners at opposite ends of the strap, where the two first responder fasteners are configured to provide two corresponding connection points of the rescue harness to the first responder.

Figure 6:
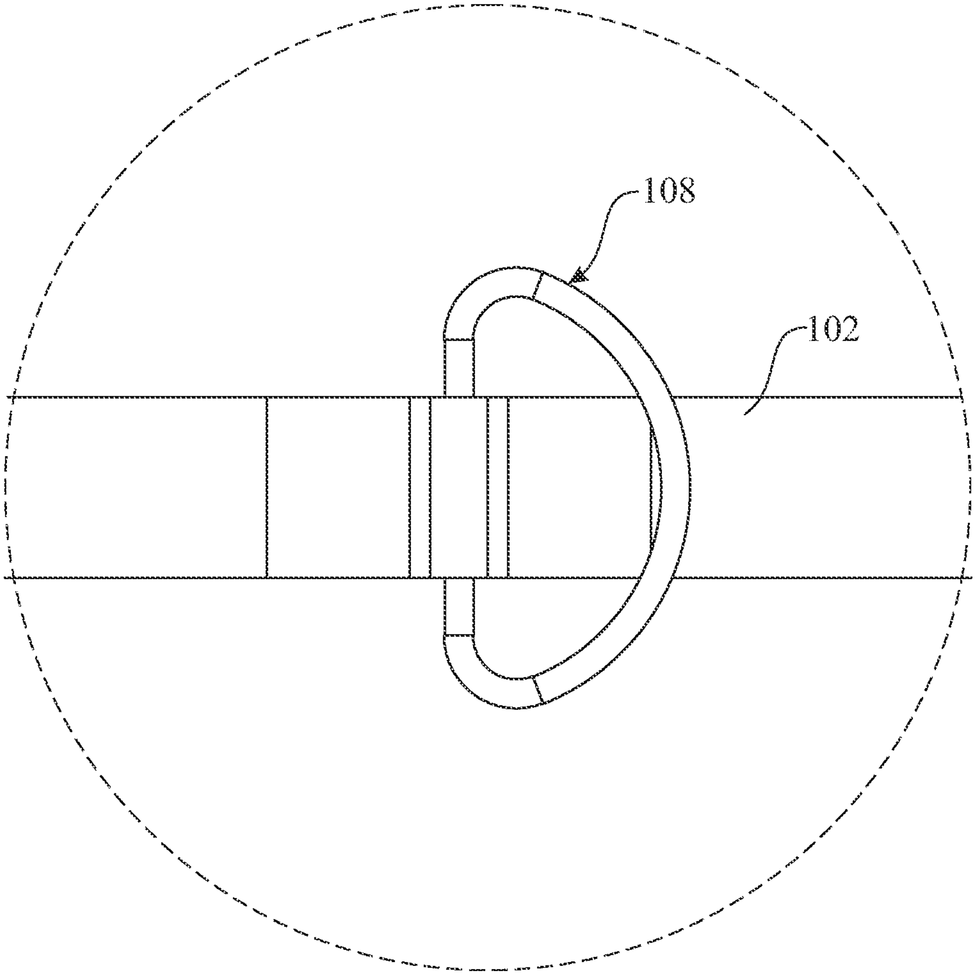
FIG. 6 presents an enlarged view of a fastener connected to a bottom portion of the strap in accordance with the first illustrative embodiment of the present invention.

FIG. 6 illustrates an example of the second fastener 108 coupled to the second (e.g., bottom) portion 112 of the strap 102 and which may be configured to, for example, provide an additional connection for additional victims. In some embodiments, the strap 102 may define a third loop, which may be sized and shaped to receive the second fastener 108. In some embodiments, the second fastener 108 is a fastener that, when the rescue harness 100 is deployed on the victim, is disposed at a center of a portion of the strap 102 (see FIG. 5 for example) across the victim's upper chest area in order to permit a second victim to also be evacuated. In some embodiments, the second fastener 108 is a carabiner or a D-ring. In other embodiments, the second fastener 108 may be a loop, a hook, a buckle or any other type of known fastener or connector.

In some embodiments, the second portion 112 of the strap 102 at which the second fastener 108 is disposed is arranged opposite the first portion 110 of the strap 102 at which the at first responder fastener 104 is connected. For example, as shown in FIG. 1, the second fastener 108 is connected to a bottom portion of the strap 102 while the first responder fastener 104 is connected to a top portion of the strap 102. In other embodiments, the fasteners may be connected at other parts of the strap 102, but the first responder fastener 104 is connected at a portion of the strap 102 that preferably provides a connection point for the first responder, while the second fastener 108 is connected at a portion of the strap 102 that preferably provides a connection point for pulling a potential second victim.

Some embodiments of the rescue harness 100 may be provided as an assembly with the rescue harness 100 and a storage/transport pouch (not shown). The strap 102 may be a flexible strap and the head-rest support panel 106 may be made of a flexible material as well. The rescue harness 100 may be configured to be stored in the storage pouch by folding or rolling the flexible strap 102 and flexible head-rest support panel 106 and inserting the folded material into the storage pouch along with one or more of the fasteners 104, 108. The transport pouch may be attachable to at least one of a garment, a belt and/or a wearable equipment worn by the first responder. In this manner, a light-weight and/or compactable rescue harness assembly may be provided including the rescue harness 100 and a storage pouch sized and shaped to receive the rescue harness for convenient storage thereof and attachment to the first responder.

Figure 7:
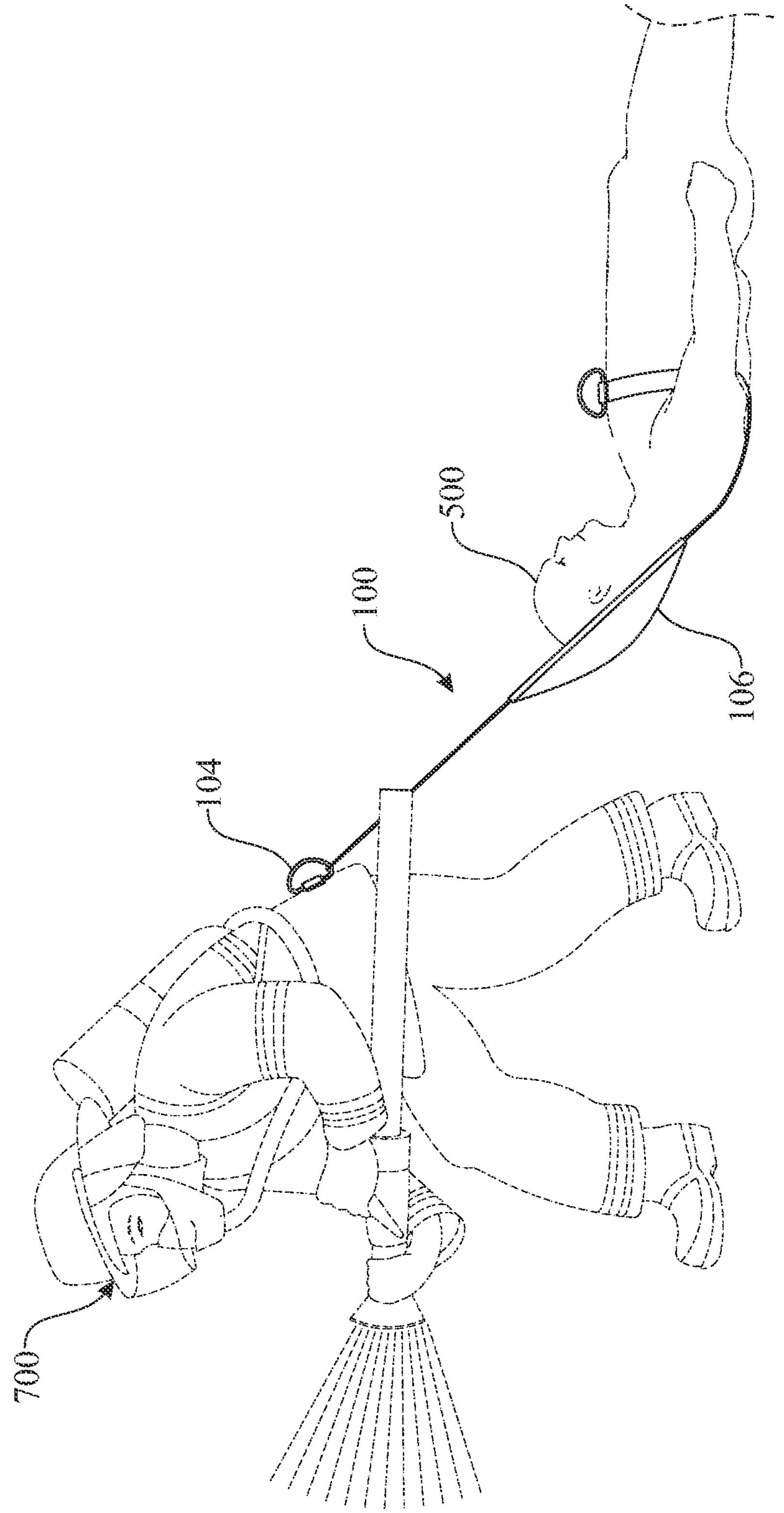
FIG. 7 is a schematic view of the rescue harness of FIG. 1 deployed on the victim and attached to a rear portion of a first responder's wearable gear in accordance with the first illustrative embodiment of the present invention, illustrating the first responder transporting the victim in a forward direction and having both hands free to actively fight a fire.

As particularly illustrated in FIGS. 5 and 7, the rescue harness 100 is deployable by for example a first responder 700 by placing the second portion 112 of the strap 102 underneath both armpits of the victim 500 to cause the strap 102 to be disposed across an upper chest of the victim and placing the first portion 110 of the strap 102 over the victim's 500 head to secure the first responder fastener 104 to (e.g., a rear portion of) a garment, a belt and/or a wearable equipment worn by the first responder 700 transporting/moving the victim (e.g., in a forward-facing position of the first responder). The head-rest support panel 106 may be slid up and down along the strap 102 to select an optimal head-rest position for the victim 500. In some embodiments, pressure from the victim's 500 weight may lock the head-rest support panel 106 in position and may tightly secure the strap 102 across the upper chest of the victim 500. As shown in FIG. 7, using the rescue harness 100 to transport the victim 500, the first responder 700 is free to use both of his hands to actively fight the fire while also moving in a forward facing direction (instead of moving in a backwards direction or using his hands to hold the victim over his shoulder).

FIG. 8 illustrates a rescue harness 200 in accordance with a second illustrative embodiment of the present invention. Reference numerals which correspond to like elements of the rescue harness 100 heretofore described with respect to FIGS. 1-7 are designated by the same reference numerals in the 200-299 series in FIG. 8. The rescue harness 200 includes an open loop strap 202, two first responder fasteners 204*a* and 204*b*, a head-rest support panel 206 and a second fastener 208, in which the head-rest support panel 206 is slidably removable from the strap 202 and also includes a dual-connection point arrangement. A retainer ring 210, such as a metal retainer ring, may be configured to couple the two portions of the strap 202 along with the head-rest support panel 206 in order to form the open loop arrangement as shown in FIG. 8. As described above, the head-rest support panel 206 is removable because of the strap 202 being "split" or open, rather than closed as with the rescue harness 100. This arrangement may allow first responders to obtain new head-rest supports when, for example, an original head-rest support panel 106 becomes stained with blood, or other bodily fluids.

In some embodiments, the strap 202 attaches to the first responder at two points of connection, instead of one, as with the rescue harness 100. The strap 202 includes two absolute ends with, for example, 1" flat loops stitched in and two carabiners as first responder fasteners 204 that can selectively provide both a single hookup connection point or separated to have two carabiners for attaching to the first responder on, for example, both sides of the first responder's belt.

Figure 9:
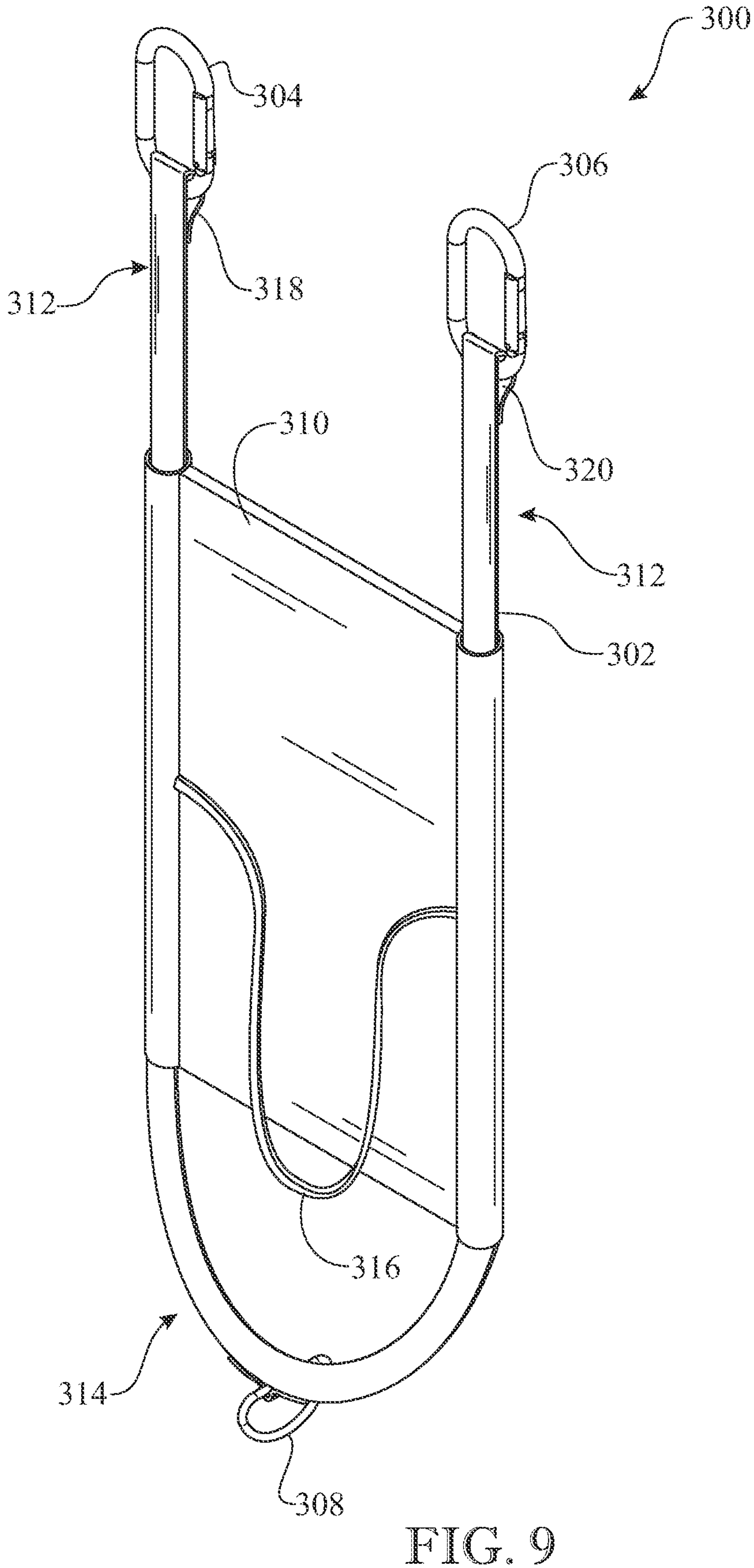
FIG. 9 presents a front, perspective view of a rescue harness in accordance with a second illustrative embodiment of the present invention.

Referring now to FIGS. 9-13, a second implementation of the invention will be discussed. More particularly, FIG. 9 presents a front, perspective view of a rescue harness 300 in accordance with a second illustrative embodiment of the present invention. As shown, the rescue harness 300 comprises a strap 302, and a head-rest support panel 310, and wherein the strap 302 includes a first portion 312 (i.e., a top portion) and a second portion 314 (i.e., a bottom portion). The strap 302 comprises at least three (3) first responder fasteners (i.e., first responder fastener 304, first responder fastener 306, and first responder fastener 308, respectively) for affixing the head-rest support panel 310 to a first responder (e.g., the first responder 700) and a victim (e.g., the victim 500). The first responder fasteners 304, 306, and 308, in the embodiment, are carabiners. However, in accordance with the principles of the disclosed embodiments the first responder fasteners may be formed as a D-ring, loop, hook, buckle or any other type of known fastener or connector that provides for a quick-release.

The rescue harness 300 is deployable by placing the first portion 312 (i.e. the top portion) of the strap 302 over the victim's head to fasten a first one of first responder fasteners (i.e., the first responder fastener 304 affixed by first loop 318) and a second one of the first responder fasteners (i.e., the first responder fastener 306 affixed by second loop 320) to at least one of a garment, a belt and/or a wearable equipment worn by the first responder 700 transporting the victim 500 in a forward-facing position of the first responder, and placing the second portion 314 (i.e., the bottom portion) of the strap underneath both armpits of the victim to cause the strap to be disposed across an upper chest of the victim together with a third one of the first responder fasteners (i.e., the first responder fastener 308) that is secured by an elastic restraint 316.

The strap 302 may be a load-bearing strap. In some embodiments, the strap 302 may be configured to bear at least a 1000 pounds (lbs.) load. In some embodiments, the strap 302 may be configured to bear more or less than 1000 pounds but should preferably be configured to be able to bear at least the weight of an average-sized adult male. In some embodiments, the strap 302 is formed of a flexible material that is rated for a target strength and durability for the particular rescue purposes. For example, in firefighting applications, the strap 302 may be formed of a flexible, 1"-2" tubular webbing material that is formed of a flame-resistant material. In some embodiments, the strap 302 may be made of, for example, a polyvinyl chloride (PVC) coated nylon, a vinyl-coated polyester, a two-way or four-way stretch nylon blend, a polyester mesh, or any other suitable strap material. The strap 302 and the head-rest support panel 310 are further preferably made of a washable material so that the rescue harness 300 can be washed for re-use with another victim.

In the embodiment, the strap 302 is a single-strap piece, i.e., unitary/continuous strap material comprising the first loop 318, the second loop 320, and a third loop 322 (see, FIG. 10), respectively, for receiving the first one of first responder fasteners (i.e., the first responder fastener 304), the second one of the first responder fasteners (i.e., the first responder fastener 306), and the third one of the first responder fasteners (i.e., the first responder fastener 308, respectively. The size of the strap 302 is preferably configured to provide sufficient length to, when deployed in use, pull a victim on the ground, while also being able to fasten a portion of the strap 302 to the first responder (e.g., a rear portion of a belt, a backpack, or a wearable equipment disposed on the first responder).

Figure 12:
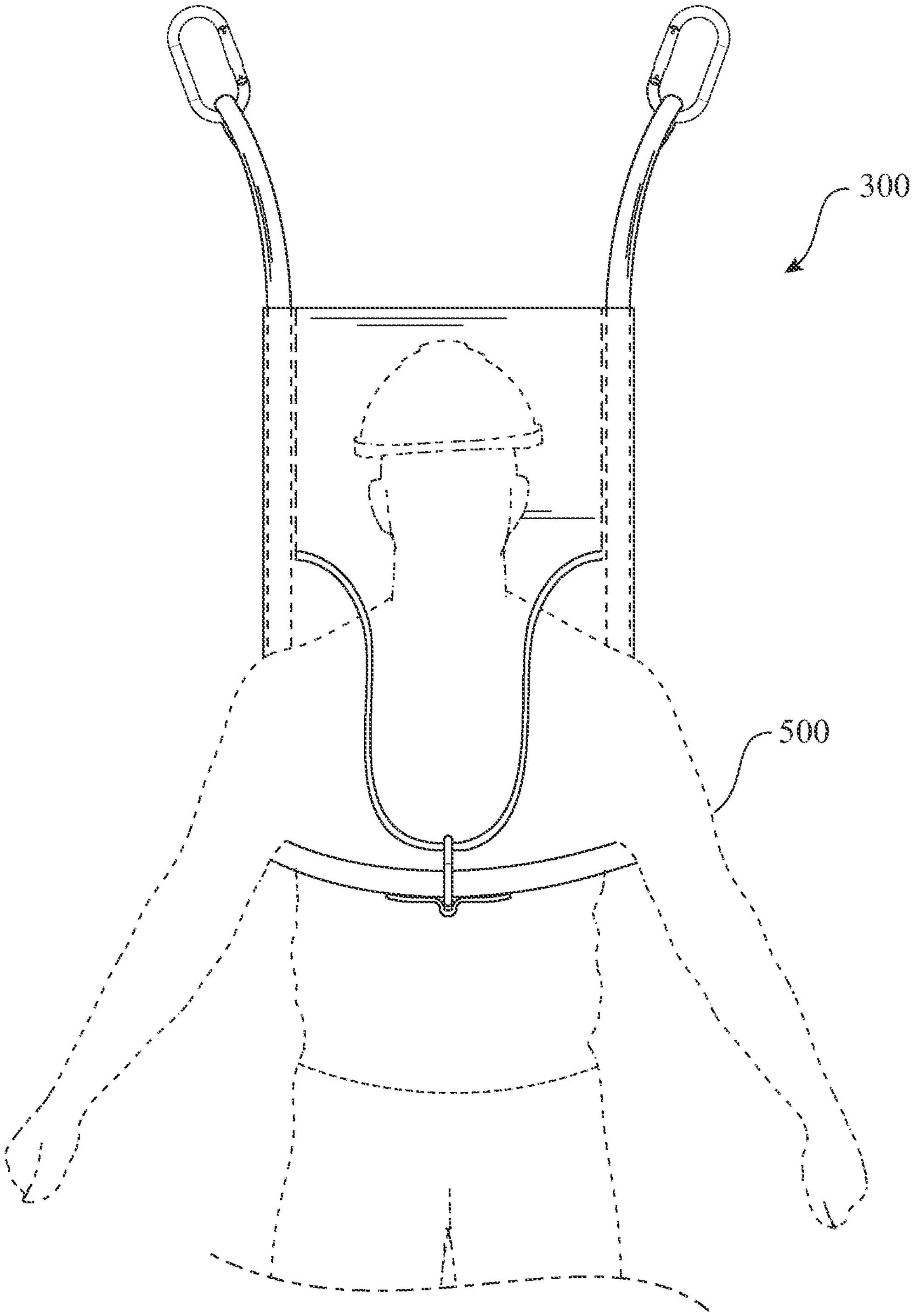
FIG. 12 presents a plan view of the rescue harness deployed on a victim in accordance with the second illustrative embodiment of the present invention.
Figure 13:
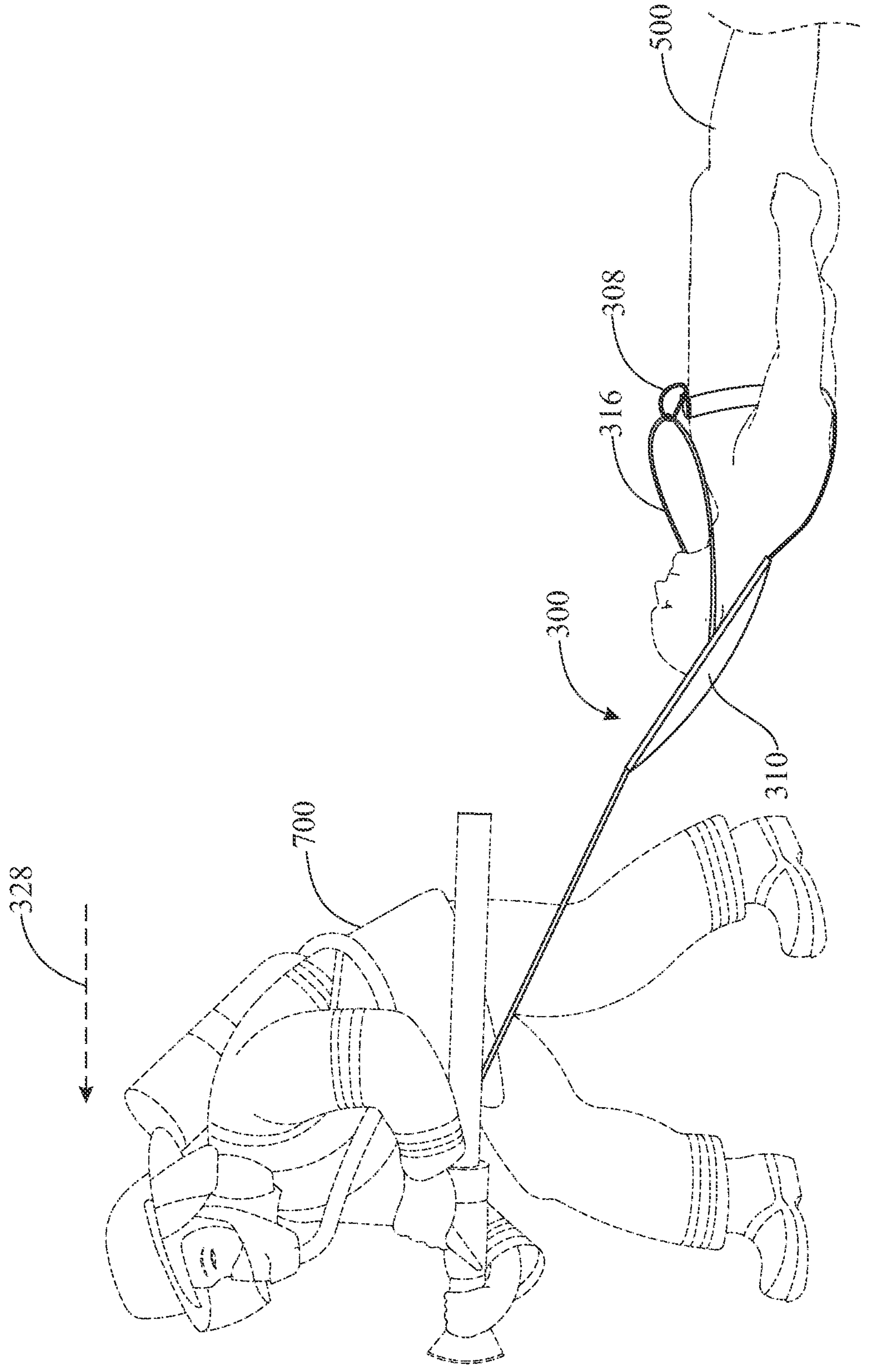
FIG. 13 is a schematic view of the rescue harness of FIG. 9 deployed on the victim and attached to a rear portion of a first responder's wearable gear in accordance with the second illustrative embodiment of the present invention, illustrating the first responder transporting the victim in a forward direction and having both hands free to actively fight a fire or attend to other real-time activities during victim transport.

The head-rest support panel 310 is a removable panel that may be formed of a flexible material that is rated for a target strength and durability for the particular rescue purpose of supporting the victim's head. In some embodiments, the head-rest support panel 310 is sized, shaped, and configured to support a head and neck area of a victim to be rescued. That is, the head-rest support panel 310 may be formed as other shapes but is preferably sized and shaped and dimensioned (length and width) to define a panel area to support/stabilize at least a head and a neck area of a standard-sized victim. In some embodiments, the head-rest support panel 310 may be made of a flame-resistant material. In some embodiments, the head-rest support panel 310 may be made of a washable material so that the rescue harness 300 can be washed for re-use with another victim. In some embodiments, the head-rest support panel 310 includes a length and a width defining a panel area configured to support/stabilize a head, a neck and a shoulder of a standard-sized victim being rescued/support by the rescue harness 300. In some embodiments, the standard-sized victim is the adult victim 500, such as shown in FIGS. 5, 12, and 13, and in some embodiments the rescue harness 300 may be sized to support a standard-sized child victim.

Figure 11:
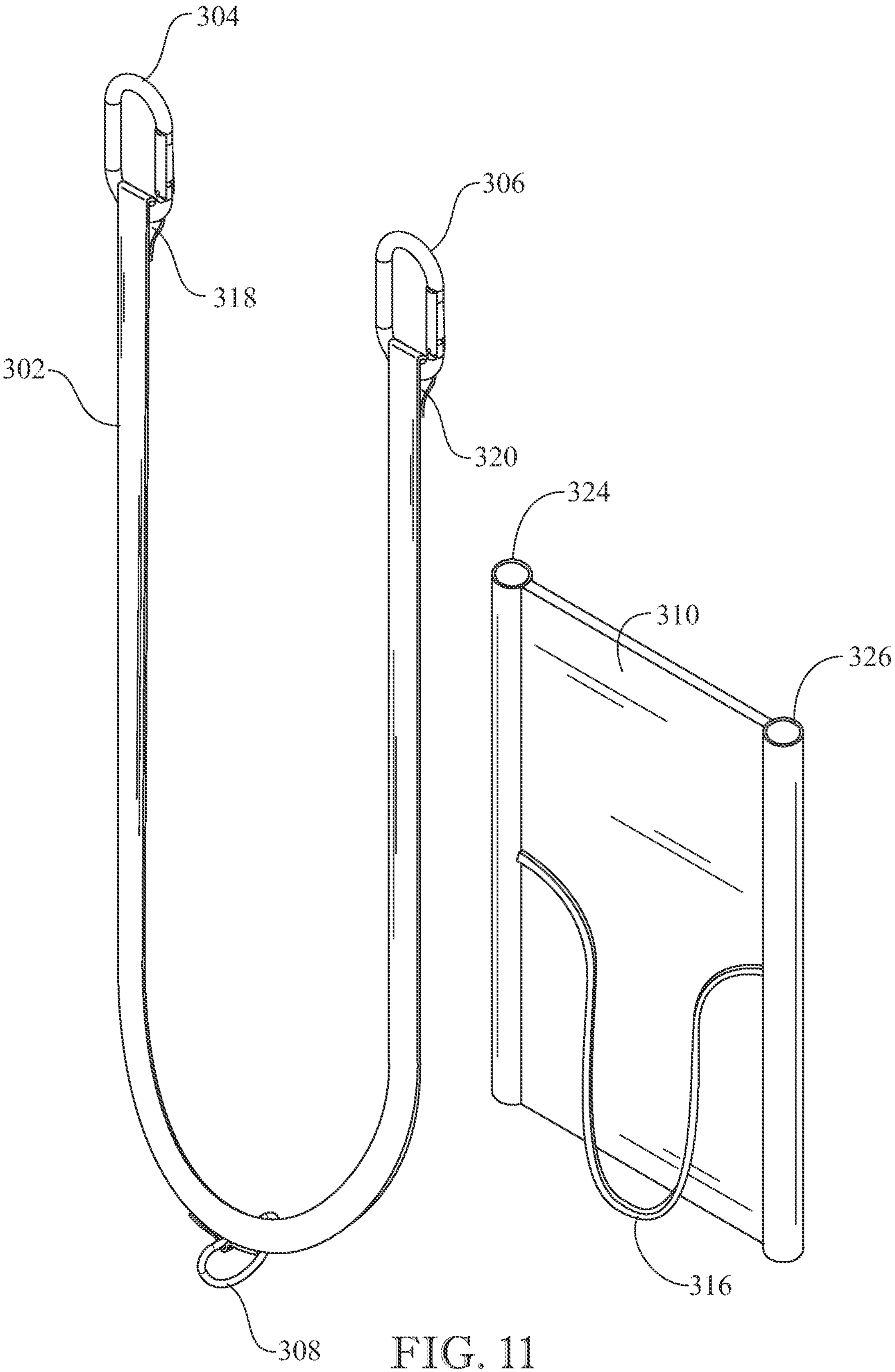
FIG. 11 presents a front, perspective view of a strap and a head-rest support panel of the rescue harness illustrated in FIG. 9, in a disassembled configuration, in accordance with an embodiment.

The head-rest support panel 310 is adjustably coupled to the strap 302 to allow the first responder to selectively adjust a position of the head-rest support panel 310 along a length of the strap 302, e.g., relative to the first responder fasteners 304 and 306, respectively, through a first sleeve 324 and a second sleeve 326 (see, FIG. 11; and as further detailed herein below). In this manner, the first responder can selectively adjust the position (e.g., vertical position) of the head-rest support panel 310 along the length of the strap 302 to suit, for example, the first responder's preferred positioning of the victim relative to the first responder and/or for a size and a height of the particular victim being transported. In this manner, the victim's head can be symmetrically supported by the head-rest support panel 310. The head-rest support panel 310 further comprises the elastic restraint 316 that will be used to secure the head-rest support panel 310 to the first responder fastener 308 (i.e., the third one of the first responder fasteners) when in use transporting the victim, as further detailed herein below.

In some embodiments, the head-rest support panel 310 is removably coupled to the strap 302. For example, FIG. 11 presents a front, perspective view of the strap 302 and the head-rest support panel 310 of the rescue harness 300 (as illustrated in FIG. 9), in a disassembled configuration, in accordance with an embodiment. In some embodiments, the head-rest support panel 310 may be slidably removable from the strap 302 by decoupling the first loop 318 and the second loop 320 at absolute ends of the strap 302, removing the first responder fastener and the second first responder fastener 306, and sliding the head-rest support panel 310 on and off of the strap 302 accordingly. In this way, the head-rest support panel 310 may be fed through the first sleeve 324 and the second sleeve 326 that are formed on each side (i.e., opposite sides) the head-rest support panel 310. This may allow the head-rest support panel 310 to be switched out in order to be replaced with a new (or washed) head-rest support panel 310, if, for example, the original head-rest support panel 310 becomes damaged, stained, or it is otherwise desired to switch out the head-rest support panel 310 for another one. In this way, as can be seen in FIG. 11, the fasteners can be removed and the head-rest support panel 310 can be entirely removed and separated from the strap 302 by sliding the head-rest support panel 310 through the first sleeve 318 and the second sleeve 320.

As shown, the first and second loops 318 and 320 may be disposed on (and/or defined by) opposite ends of the head-rest support panel 310. For example, as shown, the strap 302 includes two absolute ends that may be, for example, 1" flat loops stitched thereon. In some embodiments, the head-rest support panel 310 is adjustable up and down selectively for placement/positioning of the victim's head and then the selected position is locked in place with the pressure on the strap 302 (see, e.g., FIG. 13 where a weight of the victim 500 applies pressure on the strap 302 and secures the position of the head-rest support panel 310). In other embodiments, the head-rest support panel 310 may be coupled to the strap 302 in other configurations. In some embodiments, the first responder fastener 304 (i.e., the first one) and the first responder fastener 306 (i.e., the second one) may be coupled to the first portion 312 of the strap 102, which may be considered a top portion of the strap 302. The first responder fastener 308 (i.e., the third one) may be coupled to the second portion 314 of the strap 302, which may be considered a bottom portion of the strap 302.

The first responder fasteners 304 and 306, respectively, may be selectively couplable to a garment, a belt and/or other wearable equipment worn by the first responder. The first responder fasteners 304 and 306 may be configured to each provide a respective connection point of the rescue harness 300 to the first responder so that the first responder can pull or otherwise transport the victim with hands free. For example, FIGS. 8-12 show this embodiment including these two first responder fasteners (i.e., first responder fasteners 304 and 306, respectively) at opposite ends of the strap 302, where the two first responder fasteners are configured to provide two corresponding connection points of the rescue harness 300 to the first responder.

Figure 10:
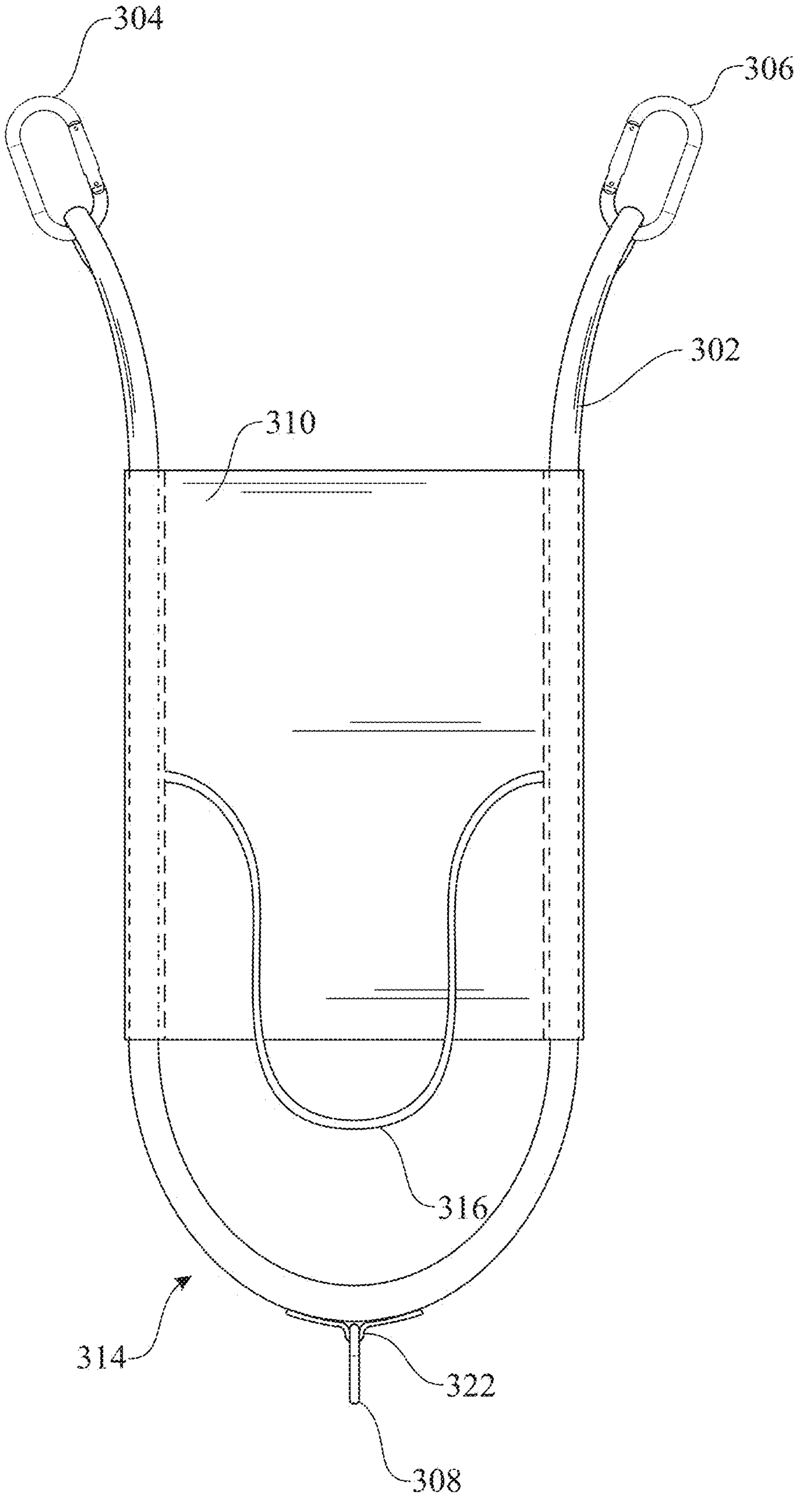
FIG. 10 presents a rear, perspective view of the rescue harness in accordance with the second illustrative embodiment of the present invention.

FIG. 10 presents a rear, perspective view of the rescue harness in accordance with the second illustrative embodiment of the present invention. Thus, FIG. 10 illustrates an example of the first responder fastener 308 (i.e., the third one) coupled to the second (e.g., bottom) portion 314 of the strap 302 using the third loop 322, and which may be configured to, for example, provide an additional connection of the strap 302 to the victim using the elastic restraint 316. In this embodiment, the third loop 322 is sized and shaped to receive the third one of the first responder fasteners (i.e., the first responder fastener 308), as shown and detailed previously in FIG. 6, and this fastener is configured and attached such that, when the rescue harness 300 is deployed on the victim, the first responder fastener 308 is disposed at a center of a portion of the strap 302 across the victim's upper chest area in order to permit for the victim's evacuation.

Turning our attention to FIGS. 12 and 13, a plan view of the rescue harness 300 deployed on the victim 500 is shown in accordance with the second illustrative embodiment of the present invention, and a schematic view of the rescue harness 300 is shown deployed on the victim 500 and attached to a rear portion of a first responder's 500 wearable gear in accordance with the second illustrative embodiment of the present invention. These Figures therefore illustrate the first responder 700 transporting the victim 500 in a forward direction and having both hands free to actively fight a fire or attend to other real-time activities during victim transport. As particularly illustrated in FIGS. 12 and 13, the rescue harness 300 is deployable by the first responder 700 by placing the second portion 314 of the strap 302 underneath both armpits of the victim 500 to cause the strap 302 to be disposed across an upper chest of the victim and placing the first portion 312 of the strap 302 over the victim's 500 head to secure the first responder fastener 304 and the first responder fastener 306 to (e.g., a rear portion of) a garment, a belt and/or a wearable equipment worn by the first responder 700 transporting/moving the victim 500 (e.g., in a forward-facing position of the first responder). The head-rest support panel 310 may be slid up and down along the strap 302 to select an optimal head-rest position for the victim 500 and attached via the elastic restraint 310 to the first responder fastener 308. The elastic restraint 316 of the head-rest support panel 310 is attached to the first responder fastener 308 (i.e., the third one) at the bottom portion 314 of the strap 302. In some embodiments, pressure from the victim's 500 weight may lock the head-rest support panel 310 in position and may tightly secure the strap 302 across the upper chest of the victim 500. As shown in FIG. 13, using the rescue harness 300 to transport the victim 500, the first responder 700 is free to use both of his hands to actively fight the fire (or take any other necessary real-time action or maneuver) while also moving in a forward facing direction 328 (instead of moving in a backwards direction or using his hands to hold the victim over his shoulder).

Although some embodiments have been described in the context of a fire fighter as a first responder transporting a victim, it should be understood that the harness arrangements described herein may be advantageously used in different fields, such as, for example, civilian, law enforcement, military, etc. to transport individuals and/or other heavy objects from one location to another.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A rescue harness comprising:

a strap;

a plurality of first responder fasteners, wherein a first one of the first responder fasteners and a second one of the first responder fasteners are connected to a first portion of the strap, and a third one of the first responder fasteners is connected to a second portion of the strap; and a head-rest support panel adjustably coupled to the strap such that a position of the head-rest support panel is selectively adjustable; and wherein the strap is a continuous, unitary strap.

2. The rescue harness of claim 1, wherein the second portion of the strap is used for placement underneath both armpits of a victim to cause the strap to be disposed across an upper chest of the victim.

3. The rescue harness of claim 1, wherein the first portion of the strap is placed over a victim's head to fasten the first one of the first responder fasteners and the second one of the first responder fasteners to at least one of a garment, a belt and a wearable equipment worn by a first responder.

4. The rescue harness of claim 1, wherein the rescue harness allows for a first responder transporting a victim in a forward-facing position of the first responder.

5. The rescue harness of claim 1, wherein the first portion of the strap is a top portion of the strap, and the second portion of the strap is a bottom portion of the strap.

6. The rescue harness of claim 1, wherein the first one of the first responder fasteners and the second one of the first responder fasteners are deployable by fastening to at least one of a rear portion of a garment, a belt and a wearable equipment worn by a first responder.

7. The rescue harness of claim 1, wherein each of the first one of the first responder fasteners, the second one of the first responder fasteners, and the third one of the first responder fasteners comprise a carabiner.

8. The rescue harness of claim 1, wherein the head-rest support panel is selectively adjusted along a length of the strap relative to the first one of the first responder fasteners and the second one of the first responder fasteners.

9. The rescue harness of claim 1, wherein the head-rest support panel is adjustably coupled to opposite sides of the strap.

10. The rescue harness of claim 1, wherein the head-rest support panel is sized, shaped, and configured to support a head and a neck area of a victim to be transported by the rescue harness.

11. The rescue harness of claim 10, wherein the head-rest support panel is sized, shaped, and configured to further support a shoulder area of the victim.

12. The rescue harness of claim 1, wherein the head-rest support panel comprises a length and a width defining a panel area configured to stabilize a head and a neck of a victim being transported by the rescue harness.

13. A rescue harness comprising:

a strap;

a plurality of first responder fasteners, wherein a first one of the first responder fasteners and a second one of the first responder fasteners are connected to a first portion of the strap, and a third one of the first responder fasteners is connected to a second portion of the strap; and a head-rest support panel adjustably coupled to the strap such that a position of the head-rest support panel is selectively adjustable; and wherein the head-rest support panel comprises a first sleeve and a second sleeve, the first and second sleeves disposed on opposite ends of the head-rest support panel, and the strap is received within the first and second sleeves for slidably adjusting the position of the head-rest support panel along the length of the strap based on a position of a victim's head.

14. A rescue harness comprising:

a strap;

a plurality of first responder fasteners, wherein a first one of the first responder fasteners and a second one of the first responder fasteners are connected to a first portion of the strap, and a third one of the first responder fasteners is connected to a second portion of the strap; and a head-rest support panel adjustably coupled to the strap such that a position of the head-rest support panel is selectively adjustable; and wherein an arrangement of the strap and the head-rest support panel are configured to lock the position of the head-rest support panel in place with a pressure from at least a portion of a victim's body weight on the strap as the rescue harness is deployed on the victim and used to transport the victim.

15. A rescue harness comprising:

a strap;

a plurality of first responder fasteners, wherein a first one of the first responder fasteners and a second one of the first responder fasteners are connected to a first portion of the strap, and a third one of the first responder fasteners is connected to a second portion of the strap, wherein the first portion of the strap is placed over a victim's head to fasten the first one of the first responder fasteners and the second one of the first responder fasteners to at least one of a garment, a belt and a wearable equipment worn by a first responder, and the second portion of the strap is used for placement underneath both armpits of a victim to cause the strap to be disposed across an upper chest of the victim;

a head-rest support panel adjustably coupled to the strap such that a position of the head-rest support panel is selectively adjustable in supporting the victim; and wherein the rescue harness allows for the first responder transporting the victim in a forward-facing position of the first responder; and wherein each of the first one of the first responder fasteners, the second one of the first responder fasteners, and the third one of the first responder fasteners comprise a carabiner.

16. The rescue harness of claim 15, wherein the head-rest support panel is sized, shaped, and configured to support a head and a neck area of the victim to be transported by the rescue harness.

17. A rescue harness comprising:

a strap;

a plurality of first responder fasteners, wherein a first one of the first responder fasteners and a second one of the first responder fasteners are connected to a first portion of the strap, and a third one of the first responder fasteners is connected to a second portion of the strap, wherein the first portion of the strap is placed over a victim's head to fasten the first one of the first responder fasteners and the second one of the first responder fasteners to at least one of a garment, a belt and a wearable equipment worn by a first responder, and the second portion of the strap is used for placement underneath both armpits of a victim to cause the strap to be disposed across an upper chest of the victim;

a head-rest support panel adjustably coupled to the strap such that a position of the head-rest support panel is selectively adjustable in supporting the victim; and wherein the rescue harness allows for the first responder transporting the victim in a forward-facing position of the first responder; and wherein an arrangement of the strap and the head-rest support panel are configured to lock the position of the head-rest support panel in place with a pressure from at least a portion of the victim's body weight on the strap as the rescue harness is deployed on the victim and used to transport the victim in the forward-facing position of the first responder.

18. A rescue harness comprising:

a strap;

a plurality of first responder fasteners, wherein a first one of the first responder fasteners and a second one of the first responder fasteners are connected to a first portion of the strap, and a third one of the first responder fasteners is connected to a second portion of the strap, wherein each of the first one of the first responder fasteners, the second one of the first responder fasteners, and the third one of the first responder fasteners comprise a carabiner, and the first portion of the strap is placed over a victim's head to fasten the first one of the first responder fasteners and the second one of the first responder fasteners to at least one of a garment, a belt and a wearable equipment worn by a first responder, and the second portion of the strap is used for placement underneath both armpits of a victim to cause the strap to be disposed across an upper chest of the victim;

a head-rest support panel adjustably coupled to the strap such that a position of the head-rest support panel is selectively adjustable in supporting the victim, wherein the head-rest support panel is sized, shaped, and configured to support a head and a neck area of the victim to be transported by the rescue harness; and wherein an arrangement of the strap and the head-rest support panel are configured to lock the position of the head-rest support panel in place with a pressure from at least a portion of the victim's body weight on the strap as the rescue harness is deployed on the victim as the first responder transports the victim in a forward-facing position of the first responder.

* * * * *